United States Patent [19]

Chopin et al.

[11] Patent Number: 5,712,218
[45] Date of Patent: Jan. 27, 1998

[54] CERIUM/ZIRCONIUM MIXED OXIDE CATALYSTS HAVING HIGH/STABLE SPECIFIC SURFACE AREAS

[75] Inventors: Thierry Chopin, Saint Denis; Olivier Touret, La Rochelle, both of France

[73] Assignee: Rhone-Poulenc Chimie, Courbevoie Cedex, France

[21] Appl. No.: 562,491

[22] Filed: Nov. 30, 1995

Related U.S. Application Data

[63] Continuation of Ser. No. 170,725, Dec. 21, 1993, abandoned.

[30] Foreign Application Priority Data

Dec. 21, 1992 [FR] France .................. 92 15376

[51] Int. Cl.$^6$ .................................................. B01J 23/10
[52] U.S. Cl. ......................... 502/304; 502/349; 502/351
[58] Field of Search .............................. 502/304, 349, 502/351

[56] References Cited

U.S. PATENT DOCUMENTS

| | | | |
|---|---|---|---|
| 4,581,343 | 4/1986 | Blanchard et al. | 502/242 |
| 4,927,799 | 5/1990 | Matsumoto et al. | 502/304 |
| 5,015,617 | 5/1991 | Ohata et al. | 502/349 |
| 5,075,276 | 12/1991 | Ozawa et al. | 502/302 |
| 5,260,249 | 11/1993 | Shiraishi et al. | 502/304 |
| 5,262,373 | 11/1993 | Durand et al. | 502/349 |
| 5,532,198 | 7/1996 | Chopin et al. | 502/304 |

FOREIGN PATENT DOCUMENTS

| | | | |
|---|---|---|---|
| 2 590 887 | 6/1987 | France. | |
| 3408096 | 10/1984 | Germany. | |
| 4-55315 | 2/1992 | Japan | 502/304 |

*Primary Examiner*—Glenn A. Caldarola
*Assistant Examiner*—Bekir L. Yildirim
*Attorney, Agent, or Firm*—Burns, Doane, Swecker & Mathis, L.L.P.

[57] ABSTRACT

Cerium/zirconium mixed oxides (optionally including yttrium values), comprising solid solutions thereof, having contents of zirconium of up to 60 atom % and having thermally stable, very high specific surface areas at least greater than 80 m$^2$/g, preferably at least 100 m$^2$/g and more preferably at least 150 m$^2$/g, are well suited as catalysts and/or catalyst supports, notably for the treatment/conversion of vehicular exhaust gases; such $Ce_xZr_{1-x}O_2$ particulates are conveniently prepared by thermally treating an aqueous solution of soluble compounds of cerium and zirconium (and optionally yttrium), e.g. the nitrates thereof, present in the desired stoichiometric amounts, and thence recovering and, if appropriate, calcining the reaction product thus formed.

42 Claims, 6 Drawing Sheets

CERIUM/ZIRCONIUM MIXED OXIDE CATALYSTS HAVING HIGH/STABLE SPECIFIC SURFACE AREAS

This application is a continuation of application Ser. No. 08/170,725, filed Dec. 21, 1993, now abandoned.

BACKGROUND OF THE INVENTION

1. Field of the Invention

The present invention relates to novel compositions based on mixed oxides of cerium and zirconium, and optionally yttrium, especially having improved specific surface areas, in particular high and thermally stable specific surface areas.

This invention also relates to a process for the preparation of such compositions, and to the use thereof, notably in the field of catalysis, whether as catalysts, per se, and/or as catalyst supports.

2. Description of the Prior Art

Cerium oxide and zirconium oxide are known compounds that are particularly useful constituents, either alone or in combination, in a wide variety of catalyst compositions, e.g., multifunctional catalyst compositions, especially catalysts suited for the treatment or conversion of exhaust gases emanating from internal combustion engines. By "multifunctional" is intended a catalyst capable of effecting not only the oxidation, in particular, of carbon monoxide and of hydrocarbons present in the exhaust gas, but also the reduction of the oxides of nitrogen also present in such gas ("three-way" catalysts).

It will be appreciated that such catalysts, both at the level of their compositional nature, as well as their principle of action, are widely described in the literature, both patent and otherwise. Given that the scientific theories which to date have been advanced to explain this fact still appear somewhat doubtful, and at times even contradictory, it nevertheless now appears well established that the "three-way" industrial catalysts, at the same time containing both cerium oxide and zirconium oxide, are overall more effective than those catalysts which are either totally devoid of the aforesaid two oxides, or devoid of only one of them.

In catalysts such as those indicated above, the cerium oxide and the zirconium oxide, which moreover can exert a proper catalytic function and/or a simple support function for other catalytic elements such as platinum, rhodium and other precious metals, are generally present in an uncombined form, namely, these two constituents are present in the final catalyst in the form of a simple physical admixture of well-individualized oxide particles. This results in part from the fact that these catalysts based on cerium oxide and zirconium oxide are characteristically produced by intimate mixing of the corresponding oxide powders, or even of thermally decomposable precursors of these oxides.

However, for a variety of reasons, a more and more marked tendency is developing in this art to introduce and to employ the elements cerium and zirconium in the catalyst composition, not in a separate and uncombined form, but, to the contrary, directly in the form of a true mixed oxide $CeO_2/ZrO_2$ of the solid solution type.

Nonetheless, in such catalysts a mixed oxide is required having a specific surface area which is as high as possible and also, preferably, thermally stable. Indeed, taking account of the fact that the efficiency of a catalyst is generally all the greater when the surface area of contact between the catalyst (catalytically active phase) and the reactants is high, it is expedient that the catalysts, both while fresh and after prolonged use at more or less elevated temperatures, be maintained in a state which is the most finely divided possible, i.e., the solid particles, or crystallites, comprising same should remain as small and as individualized as possible. This cannot be attained except by starting from mixed oxides having high specific surface areas and which are relatively stable to temperature.

It too will be appreciated that certain mixed oxides of the solid solution type in the system $CeO_2/ZrO_2$ are known to this art. Nonetheless, their preparation generally requires a calcination stage at relatively high temperature to obtain a single cubic phase. Compare, for example, E. Tani, M. Yoshimura and S. Somiya, "Revised Phase Diagram of the System $ZrO_2$—$CeO_2$ below 1400° C.", published in *J. Am. Ceram. Soc.*, vol. 66 [7], pp 506–510 (1983). The phase diagram illustrated in this publication thus indicates that, to obtain a stable phase crystallizing in the cubic habit, it is necessary to conduct calcinations and/or thermal treatments at temperatures at least greater than 1,000° C. But this is of course incompatible with producing a mixed oxide of high specific surface area. Indeed, at such elevated calcination temperatures, where the desired solid solution is certainly formed, the specific surface area of the product obtained does not exceed 10 $m^2/g$, and typically is even less than 5 $m^2/g$. In summary, the mixed oxides heretofore known to this art are therefore not well suited for catalyst applications.

SUMMARY OF THE INVENTION

Accordingly, a major object of the present invention is the provision of novel $CeO_2/ZrO_2$ mixed oxides of the solid solution type, having large specific surface areas, and this over a wide range of compositions, in particular at high contents of zirconium.

Another object of the present invention is the provision of such novel $CeO_2/ZrO_2$ mixed oxides which retain a large specific surface area even after calcination(s) at elevated temperatures.

Still another object of this invention is the provision of particular synthetic technique for the preparation of said novel $CeO_2/ZrO_2$ mixed oxides.

Briefly, the present invention features particulates of cerium/zirconium (and optionally yttrium) mixed oxides, comprising solid solutions thereof and having a specific surface area of at least 80 $m^2/g$, prepared by thermally treating/reacting an aqueous formulation of water-soluble compounds of cerium and zirconium (and optionally yttrium), said compounds of cerium, zirconium and, optionally, yttrium being present in predetermined stoichiometric amounts, and thence recovering the reaction product thus produced.

DETAILED DESCRIPTION OF BEST MODE AND PREFERRED EMBODIMENTS OF THE INVENTION

Figure 1:
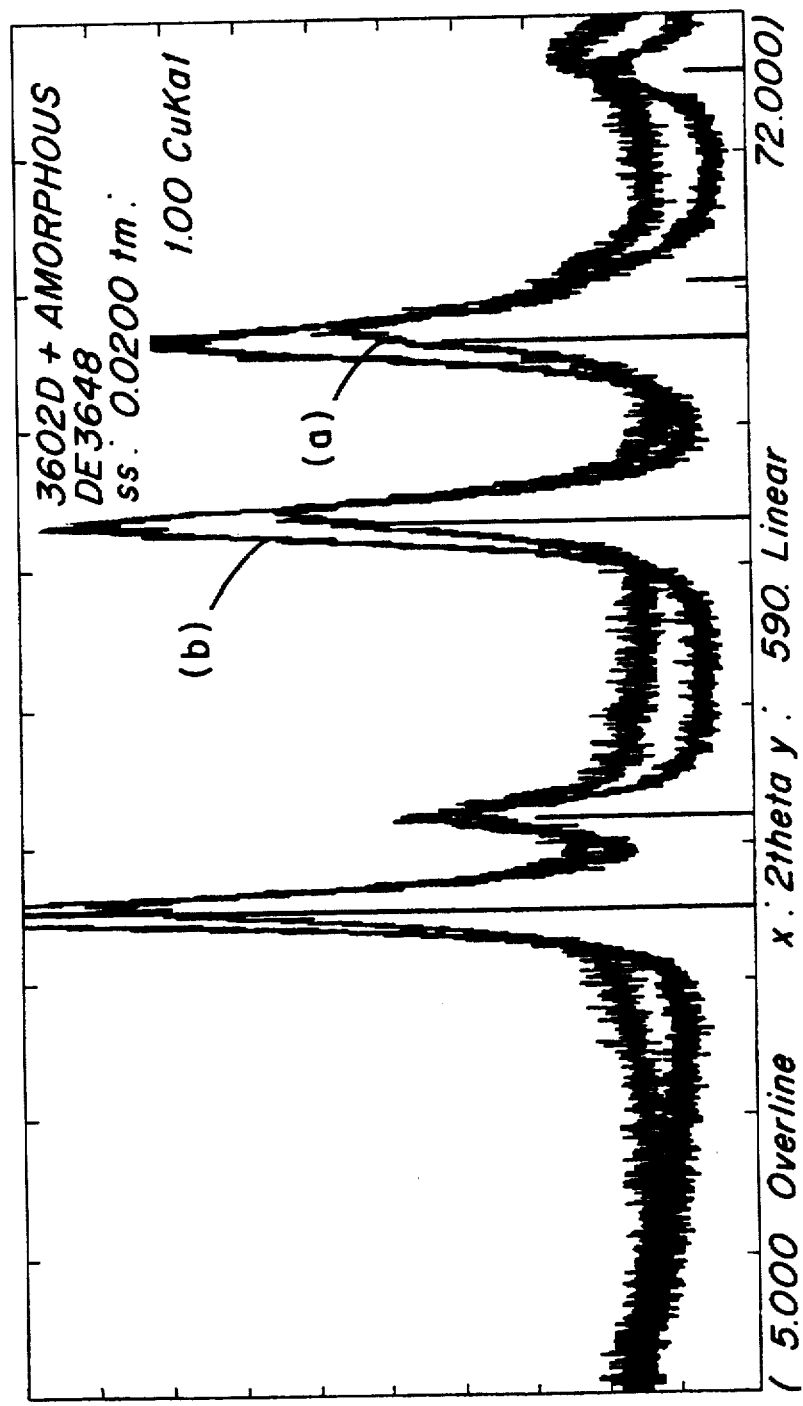
FIGS. 1 to 6 are X-ray diffraction spectra of cerium/zirconium mixed oxides according to the present invention, as well as of comparative samples.

More particularly according to the present invention, it has now surprisingly been found that true solid solutions between a cerium oxide and a zirconium oxide (and optionally an yttrium oxide) can be produced via technique, one of the critical and principal features of which is that it is carried out at reaction temperatures which are so unusually low vis-a-vis the known state of the art of the synthesis of solid solutions. The products thus formed then naturally have specific surface areas which are sufficiently high for catalyst applications.

Herein, by "specific surface area" is intended the B.E.T. specific surface area determined by adsorption of nitrogen in accordance with the standard ASTM D 3663-78, emanating from the BRUNAUER-EMMETT-TELLER technique described in *Journal of the American Chemical Society,* 60, 309 (1938).

Also, each time that the expression "mixed oxide based on cerium and zirconium" is employed, it connotes a composition which can additionally contain yttrium, in solid solution in the cerium oxide.

The present invention thus features novel compositions based on mixed oxides of cerium, zirconium and, optionally, of yttrium, said compositions being characterized in that they have a specific surface area of at least 80 m$^2$/g.

This invention also features a process for the preparation of said novel compositions, comprising the following essential stages:

(i) first providing a mixture, in aqueous solution, in the required stoichiometric proportions, of soluble compounds of cerium and of zirconium, and optionally of yttrium, (ii) heating the mixture thus formulated, (iii) recovering the reaction product thus obtained, and, if appropriate, (iv) calcining the reaction product thus recovered.

The process according to the invention permits obtaining pure phases of the mixed oxide type at synthesis temperatures as low as about 100° C. The phases thus formed are clearly shown by means of X-ray diffraction analyses conducted on the products later calcined at about 400° C. The calcination stage, therefore, essentially enables the crystallinity of the solid solutions to be developed and/or their specific surface area to be adjusted to a final desired value for a given application.

The compositions according to the invention are primarily characterized by their extremely high specific surface area, namely, higher than 80 m$^2$/g.

Advantageously, the compositions according to the invention have a specific surface area of at least 100 m$^2$/g, more preferably of at least 140 m$^2$/g, and even more preferably of at least 150 m$^2$/g.

In addition, according to another characteristic of the compositions of the invention, when these are subjected to relatively high calcination temperatures, as can be the case, for example, when used in the field of catalysis, especially in exhaust systems, they still continue to have a specific surface area which is quite adequate. Thus, heated to 800° C., the compositions according to the invention retain a specific surface area which is at least 30 m$^2$/g, preferably at least 40 m$^2$/g, and even more preferably at least 50 m$^2$/g. When these compositions are heated to 900° C., the surface areas are retained at values of at least 20 m$^2$/g, preferably at least 30 m$^2$/g.

In sum, the compositions according to the invention have, at the level of their specific surface areas, a very good thermal stability.

The presence of the elements cerium and zirconium (and optionally yttrium) in the compositions of the invention is evidenced by simple chemical analyses, although conventional X-ray diffraction analyses indicate the form in which they exist.

As indicated above, the aforesaid elements are present in the compositions of the invention in a combined form essentially, and preferably totally, of the solid solution or mixed oxide type. The X-ray diffraction spectra of these compositions in fact reveal the existence of only a single identifiable phase (absence of detectable interfering secondary phase) and which corresponds in actual fact to that of a ceric oxide crystallized in the cubic habit and of which the lattice unit parameters are shifted more or less in comparison with a pure ceric oxide, thus evidencing the incorporation of zirconium (optionally of yttrium) in the crystalline lattice of the cerium oxide, and therefore the production of a true solid solution.

The monophasic mixed oxides according to the invention overall correspond to the general formula $Ce_xZr_{1-x}O_2$ in which x can range from 0.4 to 1, this latter value being excluded. Advantageously, x is higher than 0.5. More particularly, x may range from 0.4 to 0.9 and even more preferably from 0.5 to 0.9.

It will thus be seen that the solid solutions of high specific surface area consistent with the invention can vary over a very wide range of composition. The upper content limit of zirconium in the composition is indeed only dictated by the sole limit of solubility of this species in the cerium oxide.

In all instances, and even in particular at significant concentrations of zirconium (especially higher than 10 atom %), the compositions according to the invention, other than having very high and stable specific surface areas, continue to be present in a form which is perfectly monophasic and of the cubic $CeO_2$ type.

For purposes of indicating the significance of the formula given above, it should be noted that the formula $Ce_{0.7}Zr_{0.3}O_2$ will then correspond in aggregate to a mixed oxide composition consistent with the invention containing, for example, 30 atom % of zirconium in solid solution in the cerium oxide.

The process for the preparation of the compositions according to the invention will now be more fully described.

As indicated above, the first stage of the process of the invention entails preparing a mixture, in aqueous phase, containing at least one soluble cerium compound and at least one soluble zirconium compound and, optionally, at least one soluble yttrium compound. The mixture can be obtained, equally as well, either from compounds initially in the solid state which will thereafter be introduced into a base stock of water, or more directly from solutions of these compounds and then the mixing, in any order, of said solutions.

Exemplary cerium compounds soluble in water include the salts of cerium IV such as the nitrates or ceric ammonium nitrates, which are particularly well suited. Preferably, ceric nitrate is used. The solution of cerium IV salts can contain, without disadvantage, cerium in the cerous state, but it is desirable that it contains at least 85% of cerium IV. An aqueous solution of ceric nitrate can be obtained, for example, by reacting nitric acid with a hydrated ceric oxide prepared in conventional manner via reaction of a solution of a cerous salt, for example cerous carbonate, with a solution of ammonia in the presence of hydrogen peroxide. Preferably, a solution of ceric nitrate is employed, obtained by electrolytic oxidation of a solution of cerous nitrate such as described in FR-A-2 570 087.

It will also be appreciated that the aqueous solution of salts of cerium IV can have a certain initial free acidity, for example a normality ranging from 0.1 to 4N. According to the present invention, it is possible to employ an initial solution of salts of cerium IV effectively having a certain free acidity as indicated above as a solution which will have been neutralized beforehand in a more or less extensive manner by addition of a base, such as, for example, a solution of ammonia or even of alkali metal hydroxides (sodium, potassium, etc.), but preferably a solution of ammonia, such as to limit this acidity. It is then possible, in this latter instance, to define in a practical manner a ratio of neutralization (r) of the initial solution of cerium by the following equation:

$$r = \frac{n3 - n2}{n1}$$

in which n1 represents the total number of moles of Ce IV present in the solution after neutralization; n2 represents the number of moles of OH$^-$ ions effectively required to neutralize the initial free acidity contributed by the aqueous solution of salt of cerium IV; and n3 represents the total number of moles of OH$^-$ ions contributed by the addition of the base. When "neutralization" is in fact carried out, in all instances a quantity of base is used which necessarily must be less than the quantity of base which would be required for total precipitation of the hydroxide species Ce(OH)$_4$ (r=4). In practice, this is thus limited to ratios of neutralization not exceeding 1, and more preferably not exceeding 0.5.

Exemplary soluble compounds of zirconium include the salts of the zirconium sulfate, zirconyl nitrate or, moreover, zirconyl chloride type. Zirconyl nitrate is particularly well suited.

Finally, when it is desired to obtain a final composition also containing yttrium in solid solution, soluble compounds of yttrium are used such as the nitrates, acetates or halides, in particular chlorides, for example.

It will be appreciated that the cerium, zirconium and optionally yttrium compounds indicated above are illustrative only.

The amounts of cerium, zirconium and optionally yttrium present in the mixture must correspond to the stoichiometric proportions required to provide the desired final composition.

The initial mixture thus being formulated, in the second stage of the process of the invention (stage (ii)) it is heated or thermally treated.

The temperature at which this thermal treatment, also called thermohydrolysis, is conducted advantageously ranges from 80° C. to the critical temperature of the reaction mixture. More particularly, it can be at least 120° C. By way of example, this temperature advantageously ranges from 80° to 350° C. preferably from 90° to 200° C. and more preferably from 120° to 200° C.

This treatment can be conducted under the temperature conditions selected, either under normal atmospheric pressure, or under pressure such as, for example, the saturation vapor pressure corresponding to the temperature of the thermal treatment. When the treatment temperature is selected to be higher than the reflux temperature of the reaction mixture (namely, generally higher than 100° C.) for example selected from 150° to 350° C., the operation is then conducted by introducing the aqueous mixture containing the aforementioned species in an enclosed space (closed reactor, typically designated an autoclave), the necessary pressure then results only from the sole heating of the reaction mixture (autogenous pressure). Under the temperature conditions indicated above, and in aqueous media, it can thus be specified, by way of illustration, that the pressure in the closed reactor ranges from a value of greater than 1 bar ($10^5$ Pa) to 165 bar (165.$10^5$ Pa), preferably from 5 bar (5.$10^5$ Pa) to 165 bar (165.$10^5$ Pa). It is of course also possible to exert an external pressure which is added to that existing following the heating.

The heating can be conducted either under an air atmosphere, or under an inert gaseous atmosphere, preferably nitrogen.

The duration of the treatment is not critical, and can thus vary over wide limits, for example from 1 to 48 hours, preferably from 2 to 24 hours. In the same manner, the increase in temperature is carried out at a rate which is not critical, and the fixed reaction temperature can thus be achieved by heating the mixture, for example, for from 30 minutes to 4 hours.

During the thermal treatment, the pH of the reaction medium typically ranges from about 0 to 2 at the beginning of the treatment to about 0 to 3 upon completion thereof.

At the end of the stage (ii) of heating, a solid product is recovered which can be separated from the reaction medium by all conventional solid/liquid separation techniques such as, for example, filtration, separation, draining or centrifugation.

If necessary, to complete preparation of the product, a base such as, for example, an aqueous solution of ammonia can be introduced, directly after the heating stage, into the reaction medium. This stage thus permits the recovery yields of the obtained species to be increased.

It too will be appreciated that it is of course possible to repeat one or more times, in an identical or different fashion, a heating/reaction stage such as described above, by then employing, for example, cycles of thermal treatments.

The product as it is recovered can then be subjected to washings, which are then preferably carried out using an aqueous solution of ammonia. To eliminate residual water, the washed product can, if appropriate, lastly be dried, for example in air, at a temperature which can range from 80° to 300° C., preferably from 100° to 150° C., the drying being continued until a constant weighing is attained.

In a last stage of the process according to the invention (stage (iv)), which is not obligatory, the recovered product, after washing and/or drying if appropriate, can then be calcined. This calcination enables the crystallinity of the formed solid solution phase to be developed. It can also be adjusted and/or selected as a function of the subsequent intended temperature of use reserved for the composition according to the invention, taking account of the fact that the specific surface area of the product is so much the lower because the temperature of calcination employed is higher. Such a calcination is generally carried out in air, but a calcination conducted, for example, under an inert gas is obviously also within the scope of this invention.

As emphasized above, solid solutions can thus be prepared by employing exceptionally low synthesis temperatures, on the order of 100° C., these solid solutions then having the highest specific surface areas. Also, in actual practice, when a final calcination stage is employed, the calcination temperature is generally limited to a range of values of from 200° to 1,000° C., preferably from 400° to 800° C. Even after calcinations at high temperatures, i.e., in particular temperatures higher than those which are strictly necessary for clearly evidencing via X-ray analysis the formation of the desired solid solution, the compositions according to the invention retain specific surface areas which as wholly acceptable.

Thus, the remarkably high specific surface areas of the novel compositions according to the invention permit them to be used for very numerous applications. They are particularly well suited for catalysis applications, as catalysts and/or as catalyst supports. Notably, they can be employed as catalysts or catalyst supports for carrying out a wide variety of reactions such as, for example, dehydration, hydrosulfuration, hydrodenitrification, desulfuration, hydrodesulfuration, dehydrohalogenation, reforming, vapor-reforming, cracking, hydrocracking, hydrogenation, dehydrogenation, isomerization, dismutation, oxychlorination, dehydrocyclization of hydrocarbons or other organic compounds, oxidation and/or reduction reactions, Claus reaction, the treatment of exhaust gases from internal combustion engines, demetallation, methanation and shift conversion.

Nonetheless, one of the most important applications for the mixed oxide compositions according to the invention, as emphasized above, is their use as constituents of catalysts intended for the treatment or conversion of exhaust gases emanating from internal combustion engines. For this application, the mixed oxide compositions of the invention are generally admixed with aluminum before or after impregnation by catalytically active elements, such as precious metals. Such mixtures are then either shaped to form catalysts, for example in the form of beads, or used to form a lining of a refractory body such as a ceramic or metallic monolith, this lining per se being well known to this art as a "washcoat."

In order to further illustrate the present invention and the advantages thereof, the following specific examples are given, it being understood that same are intended only as illustrative and in nowise limitative.

EXAMPLE 1

This example illustrates the preparation of a mixed oxide of cerium and zirconium according to the invention, of formula $Ce_{0.8}Zr_{0.2}O_2$.

In the stoichiometric proportions required to obtain the mixed oxide indicated above, a first solution of zirconyl nitrate $ZrO(NO_3)_2 \cdot 2H_2O$ was mixed with a second solution of ceric nitrate, of which the initial free acidity had been first neutralized by addition of ammonia until a ratio of neutralization r (defined above) equal to 0.5 had been attained.

The mixture thus obtained was then placed in an autoclave (PARR autoclave) and thermally treated at 160° C. for 4 hours.

At the end of this treatment, the product obtained was recovered by filtration, then washed with a 2M solution of ammonia, and finally dried overnight in an oven at 80° C.

The product was lastly subjected to a calcination stage in air at 400° C. for 6 hours.

The BET specific surface area of the product thus calcined was then 153 $m^2/g$.

The X-ray diffraction diagram of this product is shown in FIG. 1, curve a.

In comparison with the X-ray diffraction spectrum of a pure ceric oxide prepared under the same conditions as above, but in the absence of zirconium (FIG. 1, curve b), a clear displacement in the position of the diffraction peaks towards large angles is observed for the product of the invention. This evidences the incorporation of the zirconium into the crystalline lattice of the cerium oxide. In addition, only the peaks corresponding to the cubic phase of the type $CeO_2$ can be detected in the X-ray diffraction diagram of the product, it not being possible to detect interfering secondary phase.

Figure 2:
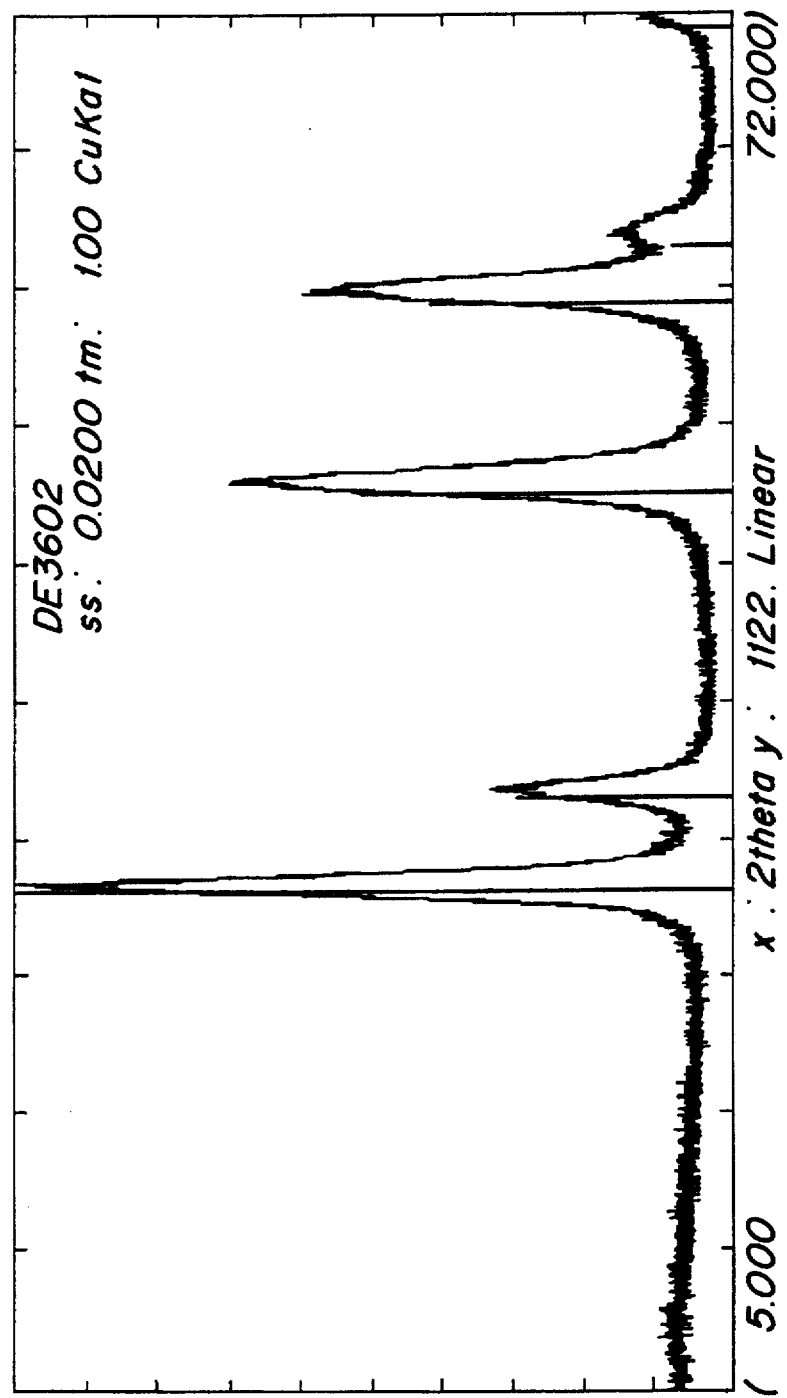

This point is moreover confirmed when a second calcination, this time effected at 700° C. for 2 hours, was carried out on the product of the invention. Indeed, the X-ray diffraction spectrum of the product thus obtained (FIG. 2) always evidences only a single crystalline phase. In addition, under these conditions, the degree of crystallization of the product was sufficient for it to be possible to measure the lattice unit parameter of the cubic phase of the type $CeO_2$ obtained. The value of this lattice unit parameter measured was then 5.36 Å (0.536 nm). It was in very good agreement with the value which can be estimated from the aforesaid publication of E. Tani et al for a mixed oxide of composition $Ce_{0.8}Zr_{0.2}O_2$ (cf. "evaluation of the evolution of the lattice parameter in the system $CeO_2$—$ZrO_2$ as a function of the rate of substitution of the cerium atoms by those of zirconium") and which was then also 5.36 Å (0.536 nm).

These results thus clearly demonstrate that, according to the present invention, a phase $Ce_{0.8}Zr_{0.2}O_2$ of the solid solution type was present at most from 400° C., which then had a BET specific surface area of 153 $m^2/g$.

EXAMPLE 2

This example illustrates the preparation of a mixed oxide of cerium, zirconium and yttrium according to the invention, of formula $Ce_{0.65}Zr_{0.30}Y_{0.05}O_2$.

In the stoichiometric proportions required to obtain the mixed oxide indicated above, (a) a solution of ceric nitrate having a free acidity of 0.62N, (b) a solution of zirconyl nitrate and (c) a solution of yttrium nitrate were mixed with shaking.

The mixture was then treated thermally at 150° C. for 4 hours in an autoclave, with constant mechanical stirring of the medium.

At the end of this treatment, a solution of ammonia was introduced into the resulting suspension, such as to increase the pH to 9.5, the entire assembly then being shaken for 30 minutes for homogenization.

A product was the recovered by filtration and was drained and then resuspended in water. This suspension was next heated to 100° C. for 1 hour.

The product was filtered again and then dried in an oven at 120° C.

The dried product was lastly calcined in air at three different temperatures for 6 hours, namely, 400° C., 800° C. and 900° C.; the specific surface areas of the products obtained then being, respectively, 157 $m^2/g$, 53 $m^2/g$ and 39 $m^2/g$.

Figure 3:
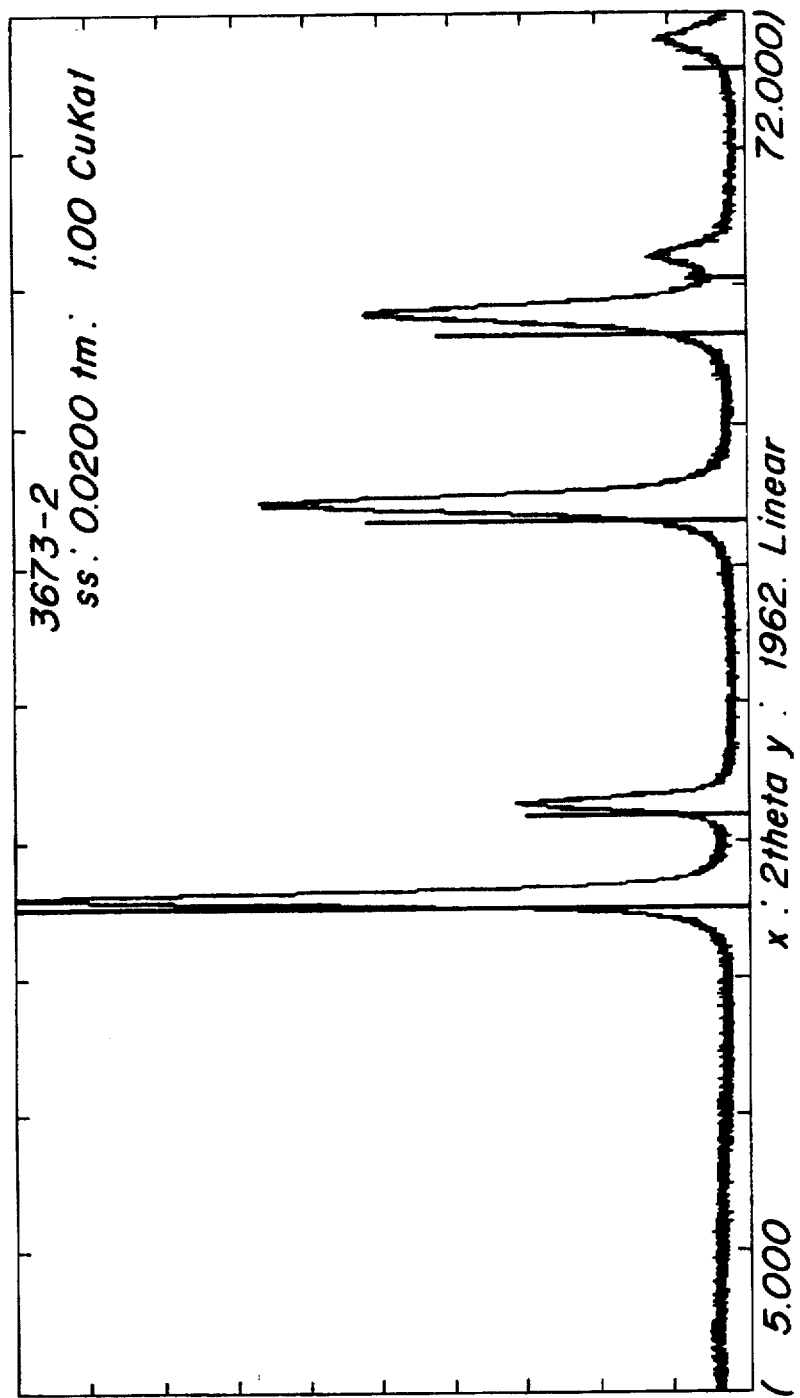

The X-ray diffraction diagram of the product obtained after calcination at 800° C. for 6 hours is shown in FIG. 3.

The lattice unit parameter measured was then 5.33 Å (0.533 nm), which again corresponded to the theoretical lattice unit parameter which can be estimated from the aforesaid publication of Tani et al.

EXAMPLE 3

This example illustrates the preparation of a mixed oxide of cerium and zirconium according to the invention, of formula $Ce_{0.83}Zr_{0.17}O_2$.

In the stoichiometric proportions required to obtain the mixed oxide indicated above, a solution of zirconyl nitrate was mixed with a solution of ceric nitrate whose initial free acidity had previously been neutralized with ammonia such as to provide a ratio of neutralization r equal to 0.

The procedure then followed was rigorously identical to that of Example 2.

The specific surface areas, at different calcination temperatures (6 hours), of the final products obtained were the following:

(i) 400° C.: 118 $m^2/g$
(ii) 800° C.: 35 $m^2/g$ (iii) 900° C.: 26 m$^2$/g

The product calcined at 800° C. had a cubic solid solution phase, of which the measured lattice unit parameter was 5.38 Å (0.538 nm).

EXAMPLE 4

This example illustrates the preparation of a mixed oxide of identical formula to that of Example 2 (Ce$_{0.65}$Zr$_{0.30}$Y$_{0.05}$O$_2$), but following a different procedure than that of Example 2 (not employing an autoclaving stage at 150° C.

The aqueous mixture prepared in Example 2 was subjected to the following cycle of thermal treatment (heating):

(1) first heating at 100° C. for 2 h, 30 min;
(2) cooling of the mixture to 45° C. in 60 minutes;
(3) addition of ammonia to adjust the pH of the medium to a value of from 9 to 9.5;
(4) second heating at 100° C. for 1 hour;
(5) cooling to ambient temperature.

The product was then recovered by filtration and dried in an oven at 120° C.

The specific surface areas, at different calcination temperatures (6 hours), of the final products obtained were the following:

(i) 400° C.: 112 m$^2$/g
(ii) 800° C.: 54 m$^2$/g
(iii) 900° C.: 33 m$^2$/g

The product obtained after calcination at 800° C. had a cubic solid solution phase, of which the lattice unit parameter measured was 5.33 Å (0.533 nm).

Figure 4:
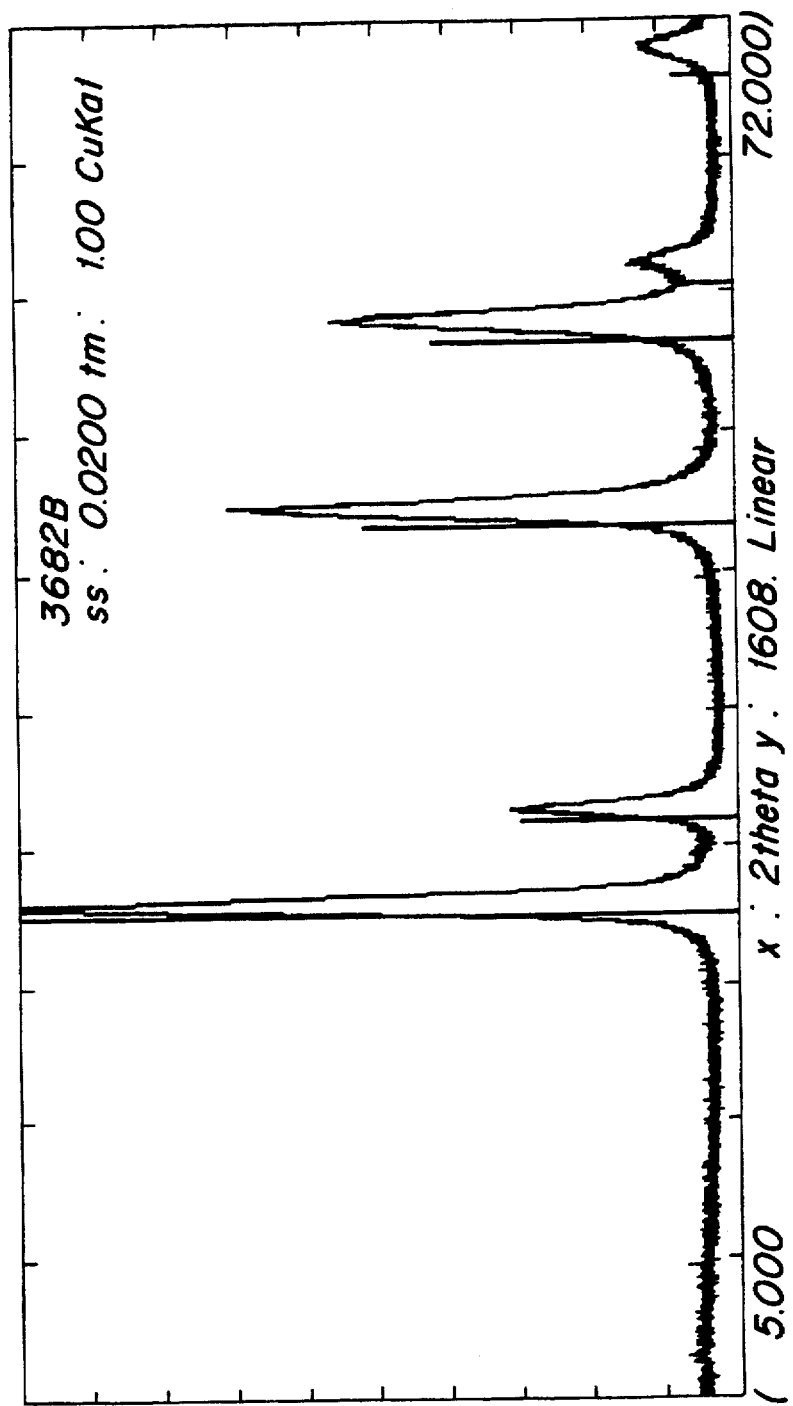

The X-ray diffraction spectrum of this product is shown in FIG. 4.

EXAMPLE 5

This example illustrates the preparation of a mixed oxide of identical formula as that of Example 3 (Ce$_{0.83}$Zr$_{0.17}$O$_2$), but according to a different procedure (no employment of an autoclaving stage at 150° C.).

In the stoichiometric proportions required to obtain the desired mixed oxide, a solution of zirconyl nitrate was mixed with a solution of cerium nitrate having a free acidity of 0.62N.

The mixture thus prepared was then treated rigorously following the procedure of Example 4.

The specific surface areas, at different temperatures of calcination (6 hours), of the final products obtained were the following:

(i) 400° C.: 151 m$^2$/g
(ii) 800° C.: 57 m$^2$/g
(iii) 900° C.: 33 m$^2$/g

The product obtained after calcination at 800° C. was a cubic solid solution phase, of which the measured lattice unit parameter was 5.36 Å (0.536 nm).

Figure 5:
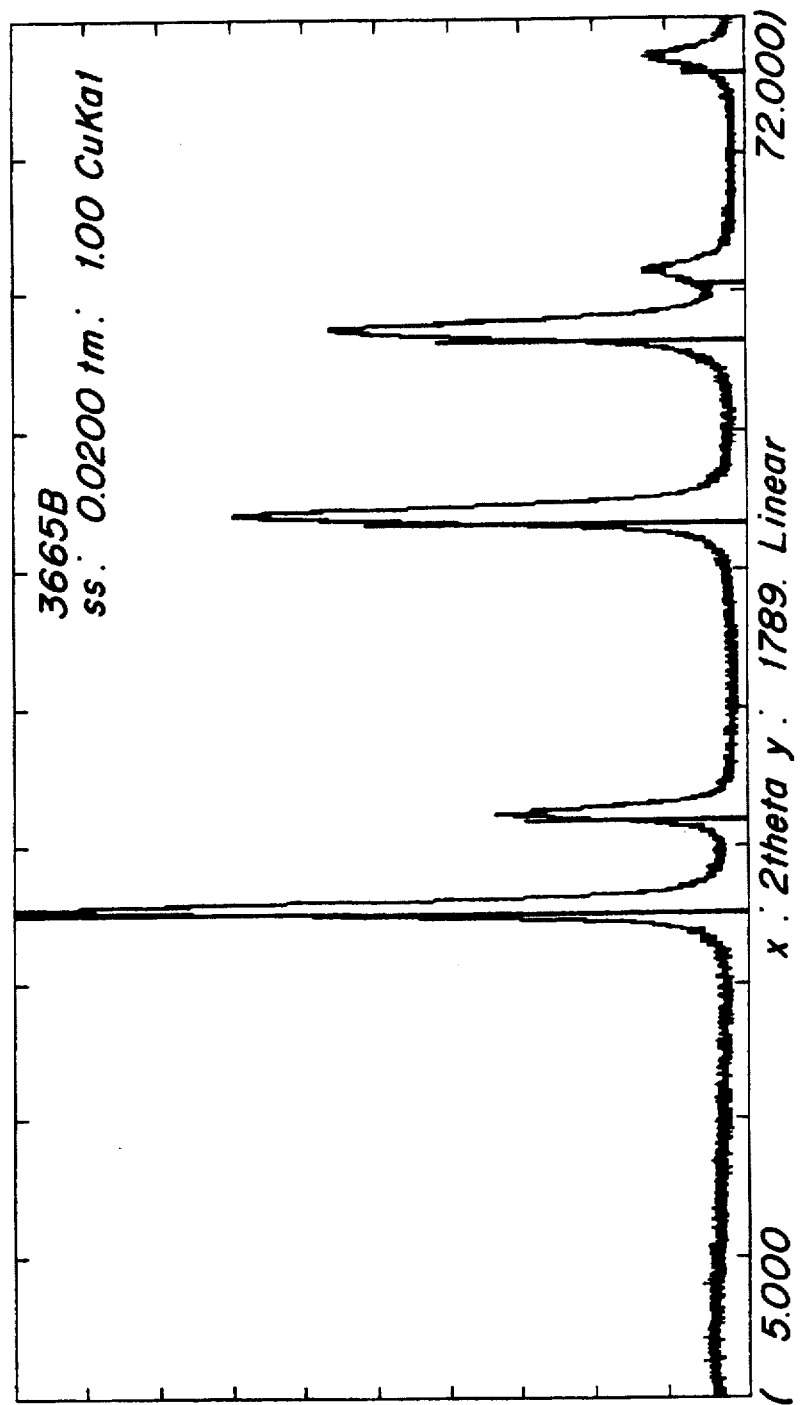

The X-ray diffraction spectrum of this product is shown in FIG. 5.

EXAMPLE 6 (Comparative)

In this example, it was attempted to prepare a mixed oxide of identical formula as that of Example 2 (Ce$_{0.65}$Zr$_{0.30}$Y$_{0.05}$O$_2$), but employing a conventional route by impregnation.

In the stoichiometric proportions required to obtain a mixed oxide of the above formula, a ceric oxide CeO$_2$ of commercial grade having a specific surface area of 250 m$_2$/g (product marketed by RHÔNE-POULENC) was impregnated by means of a first solution of zirconyl nitrate. The product thus impregnated then was dried at 110° C. in air, next the dried product was impregnated by means of a second solution of yttrium acetate Y(C$_2$H$_3$O$_2$)$_3$.4H$_2$O, and the product thus impregnated was dried again in air at 110° C.

The ceric oxide thus impregnated with zirconium and yttrium was then calcined for 6 hours at 900° C.

Figure 6:
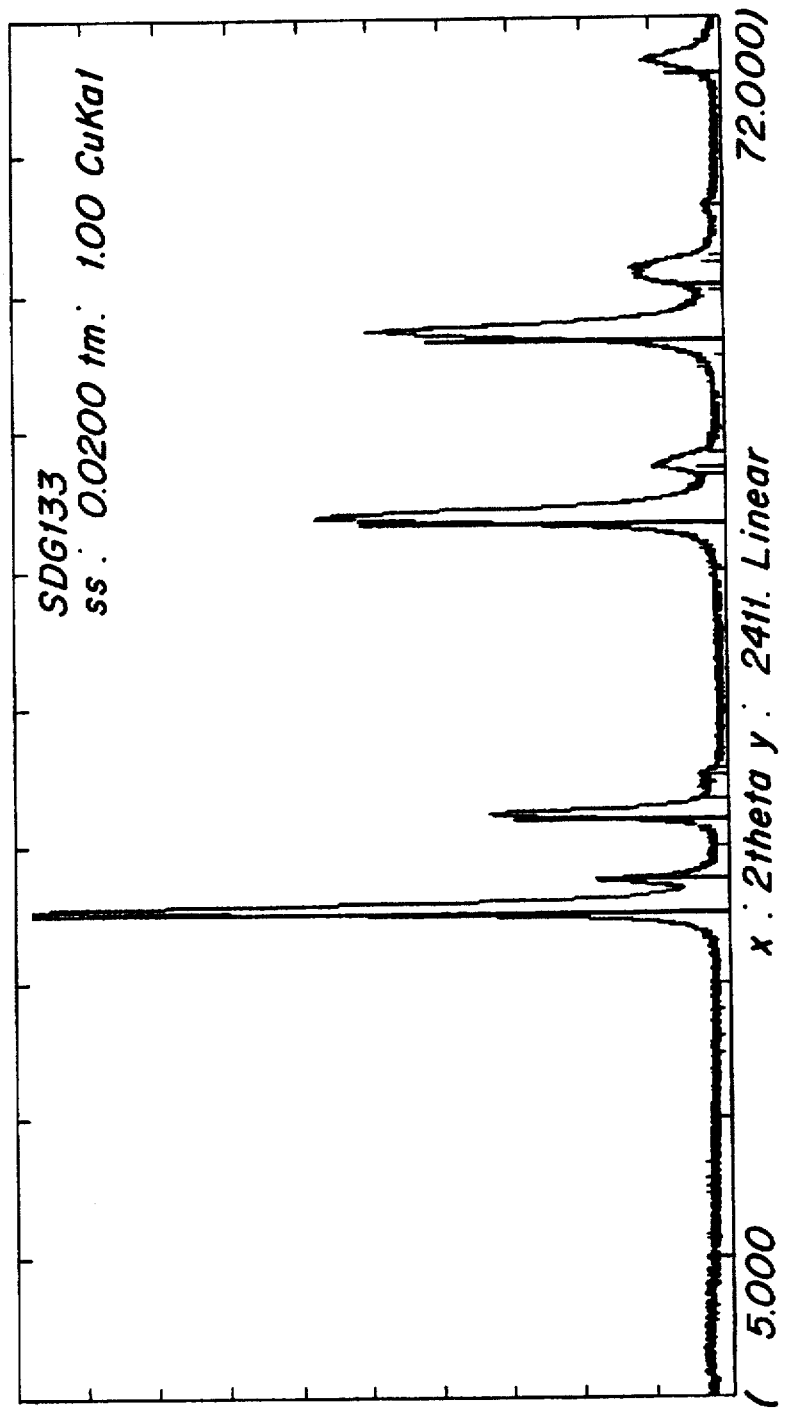

The X-ray diffraction diagram of the product then obtained is shown in FIG. 6.

Analysis of the spectrum evidences the existence of diffraction peaks attributable to the pressure of a zirconium oxide phase ZrO$_2$, thus demonstrating that it had not been possible to obtain a pure phase of the mixed oxide type.

The specific surface area of this product was 20 m$^2$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A cerium/zirconium mixed oxide presenting a pure, monophasic CeO$_2$ cubic crystalline habit of the type CeO$_2$ and having a specific surface area of at least 30 m$^2$/g after calcination at 800° C. for 6 hours.

2. The cerium/zirconium mixed oxide as defined by claim 1, having a specific surface area of at least 40 m$^2$/g after calcination at 800° C. for 6 hours.

3. The cerium/zirconium mixed oxide as defined by claim 1, having a specific surface area of at least 50 m$^2$/g after calcination at 800° C. for 6 hours.

4. The cerium/zirconium mixed oxide as defined by claim 1, having a specific surface area of at least 20 m$^2$/g after calcination at 900° C. for 6 hours.

5. The cerium/zirconium mixed oxide as defined by claim 4 having a specific surface area of at least 30 m$^2$/g after calcination at 900° C. for 6 hours.

6. The cerium/zirconium mixed oxide as defined by claim 1, comprising a solid solution thereof.

7. The cerium/zirconium mixed oxide as defined by claim 6, further comprising yttrium in the solid solution.

8. Particulates of a monophasic solid solution of a cerium/zirconium mixed oxide having the formula Ce$_x$Zr$_{1-x}$O$_2$, in which x is a number ranging from 0.5 to less than 1 and retaining a specific surface area of at least 50 m$^2$/g when heated at 800° C. for six hours, wherein the zirconium is incorporated in the crystalline lattice of the cerium oxide.

9. The particulates of a cerium/zirconium mixed oxide as defined by claim 8, wherein x ranges from 0.5 to 0.9.

10. The particulates of a cerium/zirconium mixed oxide as defined by claim 8, further comprising yttrium in the solid solution.

11. A process for the preparation of the cerium/zirconium mixed oxide as defined by claim 1, comprising thermohydrolysis of an aqueous formulation of water-soluble compounds of cerium and zirconium, said compounds of cerium and zirconium being present in stoichiometric amounts, and thence recovering the reaction product thus produced.

12. The process as defined by claim 11, further comprising calcining said reaction product thus recovered.

13. The process as defined by claim 11, said compounds of cerium and zirconium comprising salts thereof.

14. The process as defined by claim 13, said cerium compound comprising ceric nitrate or ceric ammonium nitrate.

15. The process as defined by claim 14, said zirconium compound comprising zirconium sulfate, zirconyl nitrate, zirconyl chloride, or admixture thereof.

16. The process as defined by claim 11, comprising thermally treating/reacting at a temperature ranging from 80° C. to the critical temperature of the reaction mixture.

17. The process as defined by claim 11, further comprising adding a base to the medium of reaction.

18. The process as defined by claim 17, said base comprising an aqueous ammonia solution.

19. The process as defined by claim 12, comprising calcining at a temperature ranging from 200° to 1,000° C.

20. A catalyst/catalyst support comprising the cerium/zirconium mixed oxide as defined by claim 1.

21. A catalyst as defined by claim 20, the support therefor comprising aluminum values.

22. A catalyst as defined by claim 20, comprising a monolith.

23. A catalyst as defined by claim 21, comprising a monolith.

24. A cerium/zirconium mixed oxide having the formula $Ce_xZr_{1-x}O_2$ in which x is greater than 0.5 and less than 1, said mixed oxide having a specific surface area of at least 80 $m^2/g$ and retaining a specific surface area of at least 50 $m^2/g$ when heated at 800° C. for six hours.

25. A cerium/zirconium mixed oxide presenting a pure, monophasic $CeO_2$ cubic crystalline habit of the type $CeO_2$, having the formula $Ce_xZr_{1-x}O_2$ in which x is a number ranging from 0.5 to 0.8 and having a specific surface area of at least 30 $m^2/g$ after calcination at 800° C. for 6 hours.

26. The mixed oxide as defined by claim 25, wherein x ranges from 0.5 to 0.7.

27. The mixed oxide as defined by claim 25, having a specific surface area of at least 40 $m^2/g$ after calcination at 800° C. for 6 hours.

28. The mixed oxide as defined by claim 25, having a specific surface area of at least 50 $m^2/g$ after calcination at 800° C. for 6 hours.

29. The mixed oxide as defined by claim 25, having a specific surface area of at least 20 $m^2/g$ after calcination at 900° C. for 6 hours.

30. The mixed oxide as defined by claim 25, having a specific surface area of at least 30 $m^2/g$ after calcination at 900° C. for 6 hours.

31. The mixed oxide as defined by claim 25, comprising a solid solution.

32. The mixed oxide as defined by claim 31, further comprising yttrium in the solid solution.

33. A composition based on cerium and zirconium which after heating at a temperature between 400° and 800° C., presents a pure monophasic $CeO_2$ cubic crystalline habit and wherein zirconium is incorporated in the crystalline habit of the cerium oxide.

34. A composition according to claim 33 which after heating at a temperature between 400° and 800° C., has the formula $Ce_xZr_{1-x}O_2$, in which x is a number ranging from 0.5 to less than 1.

35. A composition according to claim 33 and having a specific surface area of at least 30 $m^2/g$ after calcination at 800° C. for 6 hours.

36. A composition according to claim 33 and having a specific surface area of at least 40 $m^2/g$ after calcination at 800° C. for 6 hours.

37. A composition according to claim 33 and having a specific surface area of at least 50 $m^2/g$ after calcination at 800° C. for 6 hours.

38. A composition according to claim 33 and having a specific surface area of at least 20 $m^2/g$ after calcination at 900° C. for 6 hours.

39. A composition according to claim 33 and having a specific surface area of at least 30 $m^2/g$ after calcination at 900° C. for 6 hours.

40. The process as defined by claim 8, wherein the thermohydrolysis is carried out at a temperature from 80° to 350° C.

41. The process as defined by claim 8, wherein the thermohydrolysis is carried out at a temperature from 90° to 200° C.

42. The process as defined by claim 8, wherein the aqueous formulation has a pH of 0 to 3.

* * * * *